(12) United States Patent
Lahav et al.

(10) Patent No.: US 10,891,370 B2
(45) Date of Patent: Jan. 12, 2021

(54) PATH-BASED ACCESS CONTROL FOR MESSAGE-BASED OPERATING SYSTEMS

(71) Applicant: 2236008 Ontario Inc., Waterloo (CA)

(72) Inventors: Elad Lahav, Stittsville (CA); Danny Thomas Dodge, Ottawa (CA); Peter van der Veen, Kanata (CA)

(73) Assignee: BlackBerry Limited, Waterloo (CA)

( * ) Notice: Subject to any disclaimer, the term of this patent is extended or adjusted under 35 U.S.C. 154(b) by 273 days.

(21) Appl. No.: 15/821,226

(22) Filed: Nov. 22, 2017

(65) Prior Publication Data

US 2018/0144124 A1 May 24, 2018

Related U.S. Application Data

(60) Provisional application No. 62/425,928, filed on Nov. 23, 2016.

(51) Int. Cl.
*G06F 21/53* (2013.01)
*G06F 21/62* (2013.01)
(Continued)

(52) U.S. Cl.
CPC .......... *G06F 21/53* (2013.01); *G06F 21/6218* (2013.01); *G06F 21/6281* (2013.01); *H04L 9/30* (2013.01); *H04L 9/3242* (2013.01); *H04L 9/3247* (2013.01); *H04L 9/3297* (2013.01); *H04L 63/0442* (2013.01); *H04L 63/101* (2013.01); *H04L 63/123* (2013.01);
(Continued)

(58) Field of Classification Search
CPC ................ G06F 21/53; G06F 21/6218; G06F 2221/2107; G06F 2221/2149; H04L 63/123; H04L 9/30; H04L 9/3242; H04L 9/3297; H04L 63/101
USPC ....................................................... 713/165
See application file for complete search history.

(56) References Cited

U.S. PATENT DOCUMENTS 5,784,646 A * 7/1998 Sawada .................. G06F 12/08
710/38
5,925,126 A 7/1999 Hsieh
(Continued)

FOREIGN PATENT DOCUMENTS

KR 20120056637 A * 6/2012
WO WO 2016/164844 A1 10/2016

OTHER PUBLICATIONS

International Search Report corresponding to International Application No. PCT/CA2017/051408 dated Feb. 27, 2018, 6 pages.
(Continued)

*Primary Examiner* — Shahriar Zarrineh
(74) *Attorney, Agent, or Firm* — Rowand LLP

(57) ABSTRACT

A system and method enforce file system path-based access controls in a message-based operating system. The system and method enforce a list of rules that provide a grant and an access restriction to file system paths to server applications. A path manager receives client messages marked by a kernel to indicate that the client is subject to the path-based access controls. The path manager control access to the file systems served by the server applications in response to the rules that provide grants and access restrictions. The path manager exercises that control by transmitting messages to the client that establishes privileges to systems paths through an authentication protocol.

24 Claims, 4 Drawing Sheets

(51) Int. Cl.
  *H04L 29/06* (2006.01)
  *H04L 9/32* (2006.01)
  *H04L 9/30* (2006.01)
(52) U.S. Cl.
  CPC .............. *G06F 2221/2107* (2013.01); *G06F 2221/2149* (2013.01)

(56) References Cited

U.S. PATENT DOCUMENTS

| | | | |
|---|---|---|---|
| 6,256,636 B1* | 7/2001 | Choy | G06F 16/10 707/610 |
| 7,970,133 B2* | 6/2011 | Davidson | H04L 9/0618 380/277 |
| 8,145,614 B1* | 3/2012 | Zimran | H04L 67/1097 707/705 |
| 8,250,093 B2* | 8/2012 | Van der Linden | G06F 16/284 707/781 |
| 8,578,169 B2* | 11/2013 | Adams | H04L 63/126 713/176 |
| 8,739,308 B1 | 5/2014 | Roth et al. | |
| 8,892,865 B1 | 11/2014 | Roth et al. | |
| 8,938,808 B1* | 1/2015 | Spertus | G06F 21/10 705/51 |
| 8,997,198 B1 | 3/2015 | Kelley et al. | |
| 9,009,795 B2* | 4/2015 | Failelson | G06F 21/604 726/4 |
| 9,021,550 B2* | 4/2015 | Rits | G06F 21/60 726/2 |
| 9,503,452 B1* | 11/2016 | Kumar | H04L 67/306 |
| 9,559,849 B1* | 1/2017 | Wasiq | H04L 63/0823 |
| 9,563,786 B1* | 2/2017 | Agarwal | G06F 21/606 |
| 9,912,655 B2* | 3/2018 | Canavor | H04W 12/1006 |
| 2002/0099952 A1* | 7/2002 | Lambert | G06F 21/53 726/27 |
| 2002/0136407 A1* | 9/2002 | Denning | G06F 21/10 380/258 |
| 2003/0158960 A1* | 8/2003 | Engberg | G06Q 20/02 709/237 |
| 2004/0107342 A1* | 6/2004 | Pham | G06F 3/067 713/165 |
| 2004/0193607 A1* | 9/2004 | Kudo | G06F 21/6227 |
| 2004/0244013 A1* | 12/2004 | Yumoto | G06F 13/4013 719/321 |
| 2005/0076030 A1* | 4/2005 | Hada | G06F 21/6227 |
| 2007/0248017 A1* | 10/2007 | Hinata | G06F 3/061 370/238 |
| 2008/0148355 A1* | 6/2008 | Archer | G06F 21/6218 726/3 |
| 2008/0189559 A1* | 8/2008 | Delfs | G06F 12/1408 713/193 |
| 2010/0020812 A1* | 1/2010 | Nakamura | H04L 45/302 370/401 |
| 2011/0035586 A1* | 2/2011 | Clermont | G06F 21/53 713/164 |
| 2011/0055571 A1* | 3/2011 | Gluck | H04L 63/0869 713/171 |
| 2011/0137863 A1* | 6/2011 | Anzai | G06F 16/1824 707/639 |
| 2011/0185073 A1 | 7/2011 | Jagadeeswaran et al. | |
| 2013/0125217 A1* | 5/2013 | Edwards | G06F 21/6218 726/4 |
| 2013/0179991 A1* | 7/2013 | White | G06F 21/53 726/29 |
| 2013/0219176 A1* | 8/2013 | Akella | H04L 63/0815 713/165 |
| 2013/0246698 A1* | 9/2013 | Estan | G11C 7/1072 711/108 |
| 2013/0263214 A1* | 10/2013 | Yamagata | H04L 47/808 726/1 |
| 2013/0275620 A1* | 10/2013 | Morita | H04L 45/42 709/244 |
| 2014/0281555 A1 | 9/2014 | Dixon | |
| 2014/0325640 A1* | 10/2014 | Aggarwal | G06F 21/31 726/18 |
| 2015/0020214 A1* | 1/2015 | Copsey | G06F 21/6218 726/27 |
| 2015/0135261 A1* | 5/2015 | Park | H04L 63/102 726/1 |
| 2015/0222604 A1 | 8/2015 | Ylonen | |
| 2016/0134593 A1 | 5/2016 | Gvili | |
| 2016/0337369 A1* | 11/2016 | Sanso | H04L 63/102 |
| 2016/0344767 A1* | 11/2016 | Baldwin | G06F 21/32 |
| 2016/0359913 A1 | 12/2016 | Gupta et al. | |
| 2017/0175411 A1* | 6/2017 | Bowers | G07F 19/201 |
| 2017/0220598 A1* | 8/2017 | Lu | H04L 67/10 |
| 2018/0024874 A1 | 1/2018 | Al Sharnouby | |
| 2018/0144124 A1* | 5/2018 | Lahav | G06F 21/53 |
| 2019/0238949 A1* | 8/2019 | Hu | H04L 41/0893 |

OTHER PUBLICATIONS

Written Opinion corresponding to International Application No. PCT/CA2017/051408 dated Feb. 27, 2018, 6 pages.

EPO, Extended European Search Report relating to EP application No. 17874170.8 dated Apr. 23, 2020.

Murray A P et al., "Pulse" Advances in Ontologies, Australian Computer Society, Inc., PO Box 319, Darlinghurst, NSW, 2010, Australia, pp. 19-25, dated Jan. 1, 2008.

* cited by examiner

PATH-BASED ACCESS CONTROL FOR MESSAGE-BASED OPERATING SYSTEMS

1. PRIORITY CLAIM

This application claims priority to U.S. Provisional Patent Application No. 62/425,928 filed Nov. 23, 2016, titled "Path-Based Access Control for Message-Based Operating Systems," which is herein incorporated by reference.

2. TECHNICAL FIELD

This disclosure relates to operating systems and specifically to securing message-based distributed operating systems that enable processes to run in isolation.

BRIEF DESCRIPTION OF THE DRAWINGS

This disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Message based operating systems are exposed to static and dynamic threats. These threats come from local or remote sources that have access to file system paths that serve the sending client and the receiving server. Eavesdroppers that are sometimes called intruders, interceptors, or simply attackers seek to discover or access the privileges that are granted during a file system exchange without proper authorization. Present approaches to securing systems fail to adequately secure such communication at the operating system level.

The disclosed distributed message-based operating system ensures authentication, integrity, and nonrepudiation at the operating system level. By keeping messages secure at the operating system level, the system assures that the receiver of the message can determine its origin and access privileges. This means that an unauthorized intruding process cannot disguise itself as an authorized process. The security behind the path-based access control protocol used in this distributed message-based operating system also makes it possible for the receiver to verify message integrity. The protocol ensures that messages have not been modified or replaced. The protocol also ensures that a sending client cannot deny its transmission to a receiving server.

The disclosed systems and processes secure communication and access in the file system's path namespace. Path-based access control is used to isolate system behavior from one application to another. Implemented through a sandbox or a library of access rules communicatively and tightly coupled to a path manager, the path-based access controls restrict access to the file system's path space as established for an application or groups of application clients. Here, the path-based access control applies to the path namespace and not to the communication channels. In other words, the control is path-based, rather than channel-based even when communication channels are mapped to the file system's path names.

Figure 1:
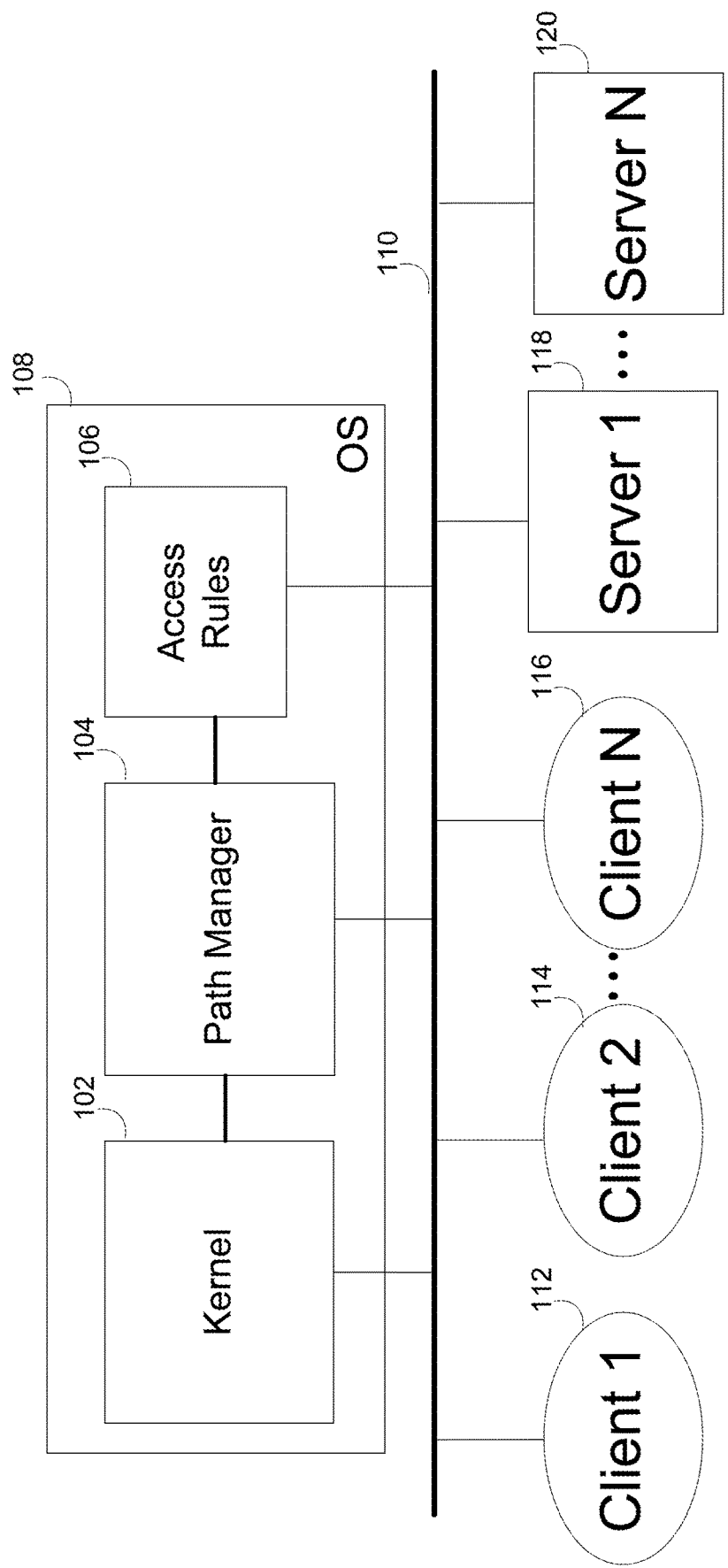
FIG. 1 is a message-based operating system enforcing path-based access controls that allow processes to run in isolation secured through authentication protocols.

In FIG. 1, file system control is not part of the kernel 102; it is separate but tightly coupled to the kernel 102. A path manager 104 tightly couples the kernel 102 and services one or more file system instances. The path manager 104 is the only process aware of the access restrictions and grant permissions provisioned through the library of access rules 106 in FIG. 1 (or the sandbox in FIG. 3). Here, the term grant permissions generally refers to a discrete access response that determines when a particular client will be granted access to a particular resource. When a client (112 or 114, or 116) opens a path in the distributed message-based operating system, a message is transmitted from the client (112 or 114, or 116) to the path manager 104 via a communication channel shown as a bus 110. Here, the client generally comprises any process that attempts to open a file through a path request; the file system generally comprises a distributed file system that differs from conventional file systems that are embedded in the kernel. The kernel 102 may comprise a microkernel meaning it may comprise the near-minimum amount of software that can provide the mechanisms needed to implement an operating system.

The path manager 104 resolves the path request by replying with a canonical, absolute, version of the file system path, as well as a list of servers (shown as 118 and 120) that can service that path. Before replying, the path manager 104 matches the canonical path against each rule in the client's-access controls (that is, the path manager 104 is enforcing the grants and access restrictions associated with the requesting client), which specify grant permissions and access restrictions. If the path matches a forbidden rule, the path manager 104 rejects the path request. If the path request matches an allowed rule, the path manager 104 signs the reply by providing and transmitting a digital signature or a signing key along with each server entry that is not restricted. Some systems implement digital signatures with a one-way hash function. In one such system, the path manager 104 signs the hash of the reply message, which is encrypted with the client thread's public key, one of two types of keys in a public key encryption. In this implementation, the client thread's private key is only available through the kernel 102; the client 112 or 114, or 116 has no knowledge or access to its own thread keys.

Upon receipt of the reply message, the client 112 or 114, or 116 transmits messages to each server 118 and/or 120 on its reply list in turn. The client messages include the digital signature or signing key provided by the path manager 104. Upon receipt, each server 118 and/or 120 produces a one-way hash of the reply. Using the digital signature or signing key received with the path manager's message, each server 118 and/or 120 requests the kernel 102 to validate the public key assigned to the message it received. If the signed hash matches the generated hash value, the signature or signing key is validated and the grant permissions and access restrictions are enforced. In this system, the one-way hash function and signature algorithm are agreed upon before the file exchange or path messaging occurs.

Encrypting the hash value of the path manager's reply message to maintain security and access privileges has many benefits. Besides the unlikely scenario of two different replies having the same hash value, signing a hash value of the reply message instead of an entire reply message saves a significant amount of time. Second, while transmitted with the reply, the digital signature (e.g., the encryption of the hash value with the client thread's key) or the signing key can be separated from the reply without affecting message integrity. Third, the digital signature of a hash and signing key can be, and usually is, much smaller than the digital signature of the entire message reducing the systems and processes bandwidth and storage requirements. Fourth, the inclusion of a digital signature or signing key in the messaging scheme assures the identity of the sender (the path manager 104) and the integrity of the file system messages. Here, the clients 112-116 cannot bypass the path manager 104 by communicating directly with the servers (118 and 120) via the communication channel 110 if its access privileges are restricted. If a message does not include a digital signature or signing key or if the digital signature or signing keys fail to match the generated or stored signatures or signing keys at the servers 118 and 120, the messages are rejected and file access is denied when the client request is subject to access restrictions.

While an example signing scheme is described, other signing schemes are used in alternate distributed message-based operating systems. These schemes ensure authentication and that the path-based access controls are enforced at the path or file system level. Some signing and verifying schemes use secret information to sign and public information to verify the signature that are not a public or a private key. Some use different algorithms that can be used to establish proof of authorship or agreement with the content of the message, but not encryption. And, some add steps or information to the signing and verifying processes, such as adding timestamps to the signatures or signing keys, for example.

The path-based access controls described may be created by an application launcher or provided by a collection of non-volatile resources that are pre-written and stored in a non-volatile memory or dynamically generated and accessible through the access rules library 106 or database. In FIGS. 1-4, the path-based access controls are applied only on all open file requests. In alternate systems (and processes) the schemes are applied to other messages subject to the path-based access controls. In FIG. 1, the kernel 102 determines if an application making an open file request is subject to path-based access controls, and if so, flags the request to bring it to the attention of the path manager 104. In some systems the kernel 102 also provides the signature generation and verification for the authentication (e.g., digital signatures or signing keys) of the message requests. In these systems, and in others, the kernel 102, detects the activity (the message transaction), but does not process the message transaction. Instead, the kernel 102 identifies the client and/or application associated with the message transaction, and if subject to path-based access controls, flags the message to indicate that the request is coming from a client subject to path-based access control. The kernel 102 has no knowledge of the semantic roles of the different messages. It flags all messages from a restricted client 112 or 114 or 116. It is up to the server 118 or 120 to act on the flag that the kernel 102 sets at least in response to a file open request (it may choose to rely on this flag for other purposes as well).

Figure 2:
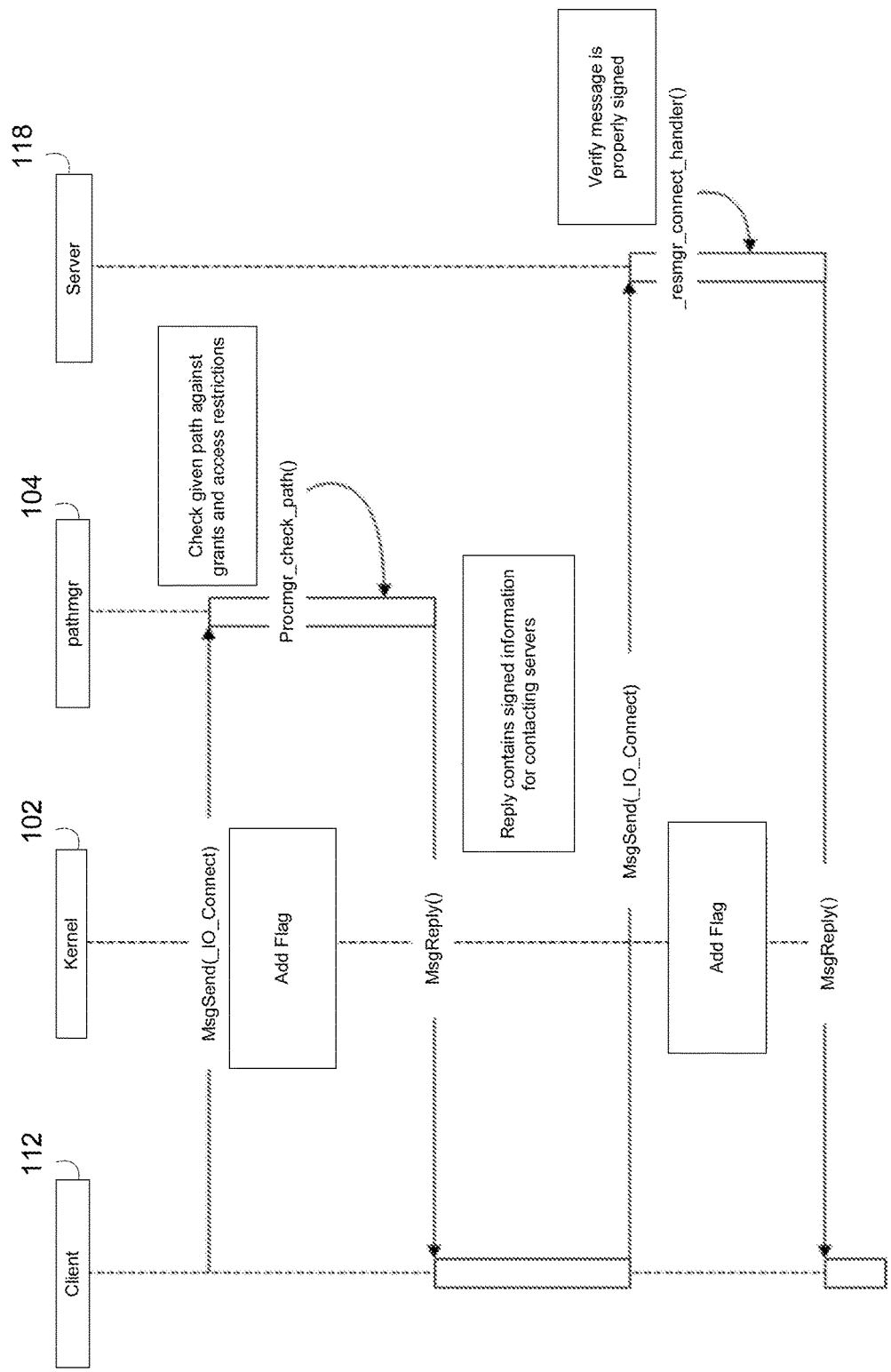
FIG. 2 is a swim-lane diagram of the message-based operating system enforcing path-based access controls that allow processes to run in isolation secured through authentication protocols.

The path and security policy enforced in the distributed message-based operating system and further shown in FIG. 2. In this process, the path manager 104 ensures that the requested file system's path-name is within the permitted namespace of the path-based access rules associated with a requesting client. The process manager 104 provides an AI for generating the access rules and validating the requested path against those rules. And, the access rules library provides a utility program to parse, translate, and compile the plain text of the access rules, that are stored in a configuration file in system memory and then converted into a binary equivalent file. An example configuration file may be shown as:
[version=1]
/foo/bar/j*.txt!/foo/bar*
Each line, except for the version header, is a global command or GLOB pattern (a GLOB pattern specifies sets of filenames with wildcard characters) against which client requests are matched. The exclamation point "!" prefix indicates that the pattern represents a rule that rejects the request, while non-prefix patterns represent allowed file paths. The last pattern is a single star "*", optionally prefixed with an exclamation point "!", which is a default rule (i.e., either accept or reject all non-matching paths).

A path-based access control structure may define the control objects that are closely coupled to the kernel 102. In some systems, the control object can consist of a header followed by a variable-length list of grants and access restriction rules. A rule comprises an action, which returns an acceptance or a rejection. The rule structure also holds the length of the pattern to facilitate quick traversal of a rule list.

In FIGS. 1 and 2 a sufficiently-privileged process can install new path-based access rule grants and access restrictions to existing and new clients and client-processes. This may be done through a message application program interface (API). Installing new resource restrictions that results in a new restricted operating environment results in the creation of an access-rule-set identification (ID), which is then used to associate with or attach with a running client-process.

When a process is associated with a restricted operating system environment, any open messages it sends are flagged by the kernel 102. This flag is processed by the path manager 104 in view of the library access rules 106.

In FIG. 2, a client 112 connects to a server 118 by opening a file path, which results in an _IO_CONNECT message being sent to the path manager 104. The path manager 104 resolves the path request by transmitting a canonical, absolute, version of the path, and a list of servers that can services the path request. Before replying, the path manager 104 matches the canonical path against each rule associated with the client requesting system or process. In one embodiment, matching only occurs if the message is properly flagged by the kernel 102. If the path matches any of the forbidding rules, the _IO_CONNECT message fails and a failure message is returned to the client requesting system or process. If the path matches an allowed rule, the path manager 104 signs the reply by providing a signing key establishing proof of authorship along with the server entries granting access.

Upon receipt of the signed message, the client transmits _IO_CONNECT messages to each server on its reply list in succession. If the client is subject to access restrictions, the message is flagged by the kernel 102; here, the message includes the signing key provided by the path manager 104. Upon verification of the signing key, the server 118 provides resources that are compliant with the permission grants and access restrictions. If a flagged message is not signed or if the signing key is not verified, the server 118 returns a rejection.

Figure 3:
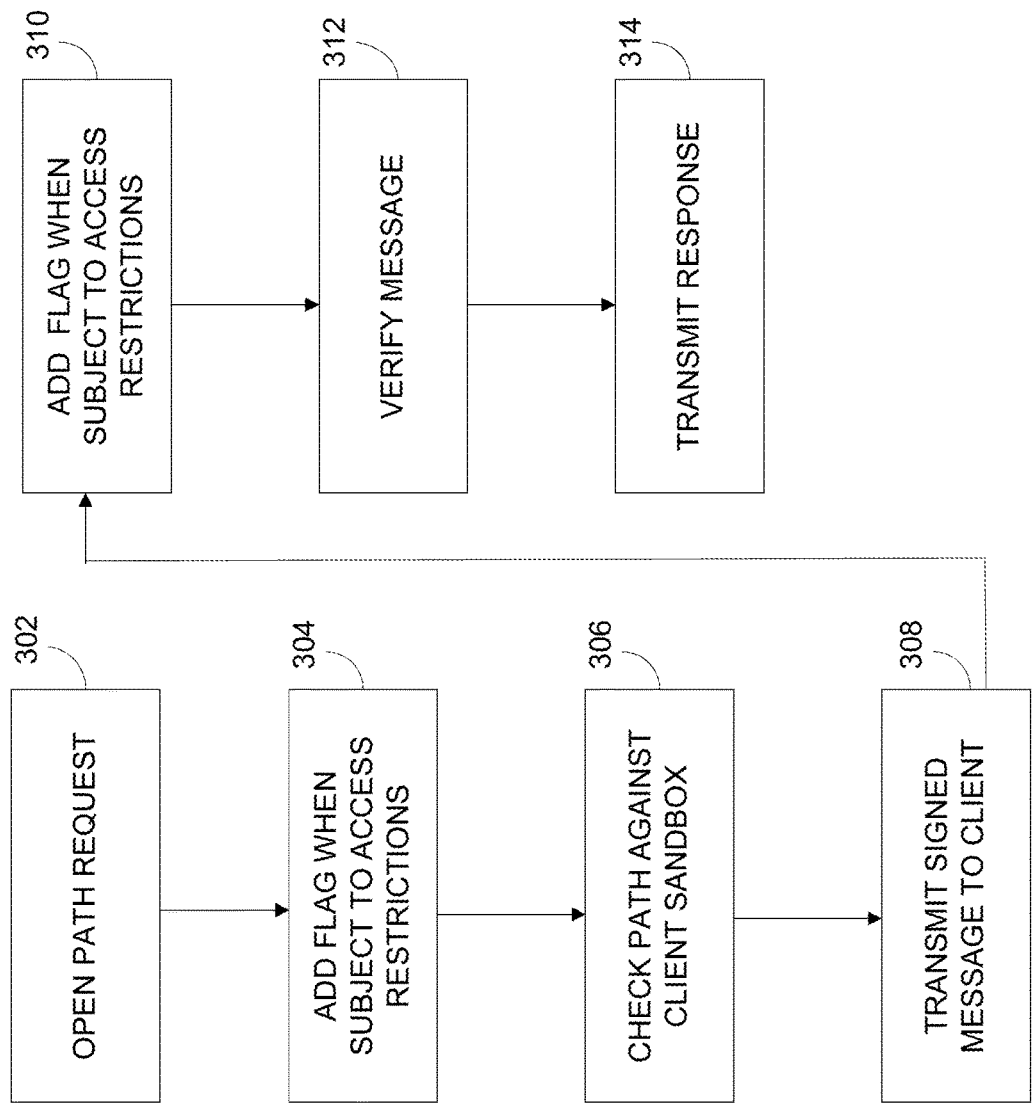
FIG. 3 is a process flow of an alternate message-based operating system enforcing path-based sandbox controls that allows processes to run in isolation secured through authentication protocols.

FIG. 3 illustrates a flow diagram of logic of an alternate system that enforces the path-based access controls in the distributed message-based operating system. The process is associated with a sandbox which comprises a list of rules that provides access grants and access restrictions. The path-based access controls begin when a client-application attempts to connect to a server application by opening a file system path at 302. The attempt to open a file system path results in an Input/Output (I/O) request being sent to the path manager 104. The kernel 102 determines if the application making the open request is sandboxed at 304, and if it is, sets a flag (e.g., a marker of some type indicating that the client-application is subject to a sandbox restriction) to bring the condition to the attention of the path manager 104. At 306, the path manager 104 ensures that the requested pathname is within the permitted namespace of the sandbox associated with the client-application requesting process. Before replying with a canonical, absolute, version of the path, as well as a list of servers 118 and 120 that can service that path, the path manager 104 matches the canonical path against each rule in the client's sandbox using the library of access rules 106. In one embodiment, the matching is only done if the message is flagged by the kernel 102 (indicating that the request is subject to sandbox restrictions). If the path matches any of the forbidding rules, the I/O request message fails and a rejection reply is sent to the client-application requesting the process. If the path matches an allowed rule, the path manager 104 signs the reply by providing a signing key or digital signature along with each permissioned server entry in the response sent to the client at 308. This is the same signing process described above.

Upon receiving the reply from path manager 104, the client proceeds to send I/O messages to each server 118 and 120 on the reply list in succession. Before receipt at the servers 118 and 120, the kernel 102 determines if the application making the successive open requests is sandboxed at 310, and if it is, sets a flag to bring the condition to the attention of each server 118 and 120. The I/O messages may now contain a flag and a digital signature or signing key provided by the path manager 104 if subject to a sandbox restriction. In response to the I/O message, the server 118 and 120 will verify the signing key or digital signature as described above at 312 and reject any messages that are not correctly signed by replying to the I/O messages sent to the servers 118 and 120 at 314.

The logic illustrated in FIG. 3 may include additional, different, or fewer operations or steps. For example, the logic illustrated in FIG. 3 may also include a different process for signing the path manager's reply to the client-application requesting process. The process (and systems) may sign the document with symmetric protocols or other asymmetric protocols than the version of public key cryptography and one-way hash function described, such as public key cryptography alone, with hash functions and date and time stamps or by other protocols such as protocols using one-way functions, for example, such as a one-way function of a password that cannot be reversed. In another example scheme, the path manager's signing key is a password, the server performs a one-way function on the password and compares the one-way function to the valued it previously stored in memory. Here, the server does not store passwords, but store the one-way function of the passwords mitigating the threat of a compromised server sharing passwords.

Similarly, the systems and process may be implemented with additional, different, or fewer components than illustrated. For instance, the disclosure describes processes that provide proof of authorship or at least agreement with the content of the messages by referring to signing keys and digital signatures separately and distinctly. This is intended to explain that the disclosure encompasses many different processes to establish authentication (allowing a receiver to ascertain its origin) including the use of alternate algorithms for showing proof that may not necessarily include encryption. In any application, the algorithms establish that the message is authentic and the message has not been altered.

The signing protocol provides a series of steps that enable two or more modules or processes to exchange information through other cryptographic security too. When using cryptographic parameters, the secure protocol is interoperable with independent programs and libraries (e.g., a collection of software and data files that perform different tasks) and allows migration from one cryptographic primitive to the next. By allowing migration from one cryptographic primitive to the next, the secure protocol is extensible, efficient, and updatable allowing it to defend against new threats and keep up with improvements that come with technological efficiencies.

The series of steps that describe the secure protocol, involve two or more modules or processes that are designed to accomplish the task of securing the communication between a client application and server application via an open bus. A "series of steps" means that the protocol has a sequence from start to finish. Unless noted, each step is completed in turn, with no step taken before the previous step is completed with some steps being optional. The order of steps may be varied; meaning, that they are not limited to a particular order. "Involve two or more modules or processes" means that at least two or more modules or processes are required to sign or verify the message (e.g., a client and a path manager, a client and a server, etc.). Finally, "designed to accomplish the task of securing the communication between a client application and a server application" means that the protocol must secure the communication across the message-based operating bus. Something that looks like the protocol but does not accomplish the task of ensuring that the sender is authentic and that only the file or path-based open request (or selected other commands) subject to restrictions that it sends was not altered in the message-based operating system and does not enable designated client processes to run in isolation does not disclose the path-based secure protocol described.

In another alternative implementation the path manager 104 is implemented in a tree structure comprising one or more nodes that are linked together in a hierarchical fashion. A node generally refers to a location on a tree structure that can have links to one or more nodes above or below it. The tree structure represents the path space in which various file systems attach to the path manager 104 in the operating system 108. File systems can attach at a root (or origin—whatever file system is first on the list) and at various locations along the paths (trunk and branches) that comprise the tree. For example, the node "/documents/elad" may be implemented in one file system at a later node before the earlier node "/documents" that is implemented by a different local or distributed file system. There is a hierarchy as to what node serves what element and the name path that may service multiple file systems.

In this alternative implementation the system and process generate one or more shadow trees of the path manager 104 that may take various forms from a multi-dimensional tree to a chain representing two or more interconnected file systems. The shadow trees may replicate nearly all of the tree structure that comprises the path manager 104, the shadow tree may comprise a subset of the tree structure that comprises the path manager 104, or the shadow tree may comprise only a single root node depending on the grants or access restrictions placed upon a client. In other words, the height and depth a shadow tree takes may depend on the level of grants and access restrictions assigned to or associated with a client. When restricted, a shadow tree prevents a client from viewing the entire path space of the system and process. The partial copy of the path space represented by the shadow tree provides only limited access rights to the file systems that are available to the path manager 104. If a client requests a file that is not part of the shadow tree associated with or assigned to it, some alternative implementation fail to acknowledge its existence (keeping that portion of the path space hidden from view and hidden from a possible attack). In other words, when accessing files through a shadow tree, users are not made aware of the actual files on the system. In another alternative implementation, the system and process may acknowledge the file's existence and transmit a reply by indicating that that the file is not accessible.

Because clients are under no obligation to access servers 118 and/or 120 that serve the files through the path manager 104, yet another alternative implementation enforces the path-based access controls described with respect to FIGS. 1 and 2 and the path-based sandbox controls described with respect to FIG. 3 with the shadow tree-based approach. One of the differences between this shadow tree-based approach and the stand-alone path-based access control implementations described with respect to FIGS. 1-3 is the implementation of the rule set. In FIGS. 1-3 the rule set is implemented in a GLOB set that the path manager 104 matches against. In the shadow tree-based alternative, the path manager 104 is implemented through shadow trees whose heights and branch reach (or length) directly correlate to the number of grants and access restrictions placed upon a client. The shadow tree may start out as the entire hierarchical tree structure of the system which is then pruned of nodes that correspond to its respective restrictions. Like most trees, shadow trees may grow or shrink depending on later granted rights or later enforced restrictions and some shadow trees may be created at the same rate information is received from a client (e.g., dynamically in real-time) or generated before a message is even received from a client. To increase scalability, the shadow trees are maintained substantially consistent.

In yet another alternative implementation, each of the path-based control systems and tree structures described above may further enforce access rights at the file systems themselves. In this further alternative implementation, multiple lines of security are enforced. For example, a system may restrict access via the path-based messaging transactions (or sandbox), shadow tree structures, and at the file systems themselves or via any combination of these technologies.

The disclosed system and process provide a secure protocol for computing devices, portable computing devices, mobile devices, and vehicles for example, that ensure secure processing even when connected to an insecure infrastructure such a physical and/or a virtual bus or a vehicle bus. A vehicle bus, such as a CAN bus, may communicate across remote wireless and/or landline channels. A vehicle may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, a vehicle comprises a device or structure for transporting persons or things.

Figure 4:
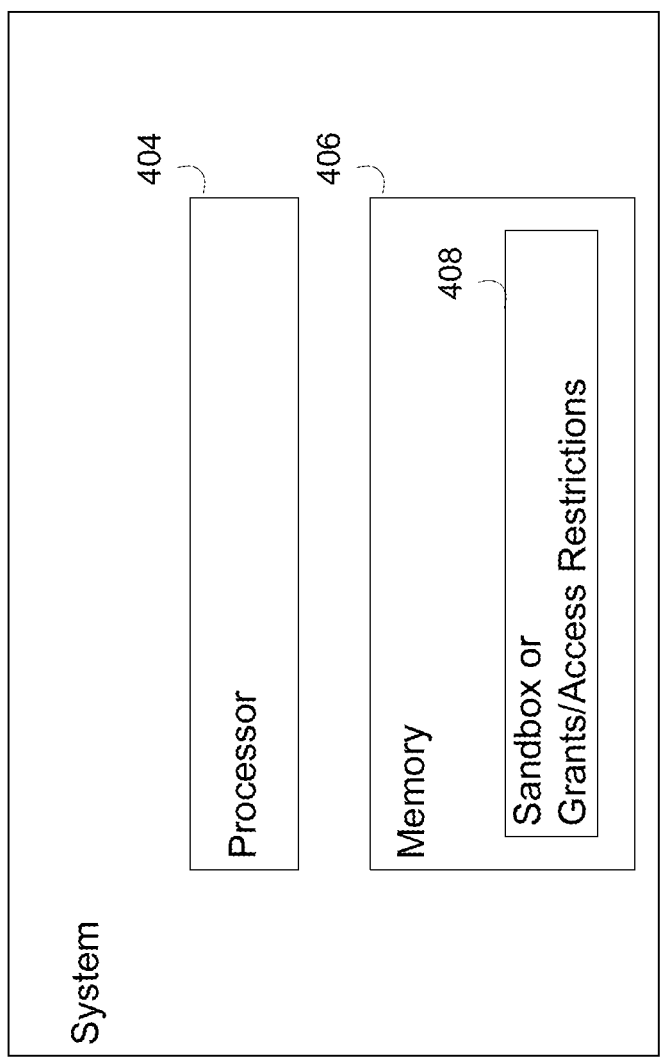
FIG. 4 is a system executing the process flows or swim-lane diagram described in this disclosure.

FIG. 4 illustrates a system implemented with additional, different, or fewer components than previously shown. It includes a memory 406, a sandbox or permission grants and access restrictions 408 and a processor 404.

The processor 404 may be in communication with the memory 406. In one example, the processor 406 may also be in communication with additional elements, such as a network interface (not shown). Examples of the processor 404 may include a general processor, a central processing unit, a microcontroller, a server, an application specific integrated circuit (ASIC), a digital signal processor, a field programmable gate array (FPGA), and/or a digital circuit, analog circuit.

The processor 406 may be one or more devices operable to execute logic. The logic may include computer executable instructions or computer code embodied in the memory 406 or in other memory that when executed by the processor 404, cause the processor 404 to perform the features implemented by the logic of the path manager 104 and/or the system. The computer code may include instructions executable with the processor 404.

The memory 406 may be any device for storing and retrieving data or any combination thereof. The memory 406 may include non-volatile and/or volatile memory, such as a random access memory (RAM), a read-only memory (ROM), an erasable programmable read-only memory (EPROM), or flash memory. Alternatively, or in addition, the memory 406 may include an optical, magnetic (hard-drive) or any other form of data storage device.

The memory 406 may include at least one or more sandbox 408, a memory management module, bus 110, the channel policy 132, message-based operating system 104, the message 110 or the kernel 120, the library of access rules 106, the kernel space 102, the path configurations, the clients 112-116, and the servers 118-120.

The system may be implemented in many different ways. Each element, such as the path manager 104, the sandbox, the library of access rules 106, may be hardware or a combination of hardware and software. For example, each element may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each element may include memory hardware, such as a portion of the memory 406, for example, that comprises instructions executable with the processor 404 or other processor to implement one or more of the features of the elements. When any one of the elements includes the portion of the memory that comprises instructions executable with the processor, the element may or may not include the processor 404. In some examples, each element may just be the portion of the memory 406 or other physical memory that comprises instructions executable with the processor 404 or other processor to implement the features of the corresponding elements without the element including any other hardware. Because each element includes at least some hardware even when the included hardware comprises software, each element may be interchangeably referred to as a module or hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, memories presented as databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the descriptions, regardless of the particular implementation described, are illustrative in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various elements are but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over data lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. However, the second action must occur as "a result of" the first action. The second action may occur at a substantially later time than the first action and still be in response to the first action. Similarly, the second action may be said to be in response to the first action even if intervening actions take place between the first action and the second action, and even if one or more of the intervening actions contribute to the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system to enforce file system path-based access control in a message-based operating system, the system comprising:
   a processor; and
   a path manager executable by the processor to enforce a list of rules that provide an access restriction to file system paths to server applications; the server applications configured to receive client messages via a communication channel in the message-based operating system; where the path manager is further executable by the processor to receive client messages flagged by a kernel to indicate that the client messages are subject to the path-based access controls; where the path manager is further executable by the processor to access the rules governing access to the file system paths; where the path manager is further executable by the processor to control access to file systems served by the server applications in response to the rules that provide the access restriction to file system paths; and where the path manager is further executable by the processor to transmit reply messages to a sender of the client messages via the communication channel that establishes limited access to the file systems paths through an authentication protocol that assures the identity of the path manager and the integrity of the reply messages at the sender of the client messages.

2. The system of claim 1, where the authentication protocol comprises a one-way hash function.

3. The system of claim 1, where the authentication protocol comprises signing each of the reply messages with a public-key cryptography and a one-way hash function.

4. The system of claim 1, where the authentication protocol comprises signing each of the reply messages with a public-key cryptography and a one-way hash function and a time stamp.

5. The system of any of claims 1 to 4, where the message-based operating system comprises a distributed operating system where a file system control is not part of the kernel.

6. The system of any of claims 1 to 5, kernel indicate that the client messages are subject to the path-based access control only in response to a client request.

7. The system of any of claims 1 to 6, where the kernel is executable by the processor to indicate that the messages are not subject to the path-based access control and the path manager is further executable by the processor to transmit reply messages to a sender of the messages via the communication channel that establishes access to the file systems paths without an authentication protocol.

8. The system of any of claims 1 to 6, where the path manager is further executable by the processor to determine that the client messages are not subject to the list of rules that provide the access restriction to file system paths and provides access to the file system paths in response to the kernel indicating that the client messages are subject to the path-based access control.

9. The system of any of claims 1 to 6, where the list of rules that the access restriction to file system paths comprises a sandbox.

10. The system of any of claims 1 to 6, where the sandbox comprises a library of access rules.

11. The system of any of claims 1 to 6, where the kernel comprises a micro-kernel.

12. The system of any of claims 1 to 6, where a configuration file generates the list of rules that provide the access restriction to file system paths.

13. The system of any of claims 1 to 6, where the server application is executable by the processor to refuse to provide limited access to the file systems paths authorized by the path manager it serves in response to the server application determining that the integrity of the reply messages was compromised by executing the authentication protocol.

14. A computer readable medium comprising instructions executable by a processor, the instructions comprising:
instructions executable to identify client messages that are subject to path-based access controls through a communication channel in a message-based operating system, where the commands to operating system elements are transmitted as client messages over a communication channel in the message-based operating systems;
instructions executable to determine access to file system paths in response to a kernel indicating that the client messages are subject to path-based access controls;
instructions executable to identify access to paths, based on a list of rules that provide a grant and an access restriction to file system paths to server applications;
instructions executable to control, in the message-based operating system, access to the file system paths; and
instructions to establish limited access to the file system paths through an authentication protocol that assures the identity of the path manager and the integrity of a reply message controlling the resources to a client process requesting access.

15. The computer readable medium of claim 14, where the kernel comprises a micro-kernel and the list of rules that provide the grant and access restriction is provisioned through a configuration file.

16. The computer readable medium of claim 14, where the authentication protocol comprises a public-key cryptography and a one-way hash function.

17. The computer readable medium of any of claims 14 to 16 where at least one of the rules of the list of rules that provide the grant and access restriction to file system paths comprises a rule that grants access to at least one of the file system paths and at least one of the rules of the list of rules that provide the grant and the access restrictions to file system paths comprises a rule that denies access to at least one of the file system paths.

18. A method to enforce file system path-based access controls in a message-based operating system, the method comprising:
identifying client messages that are subject to path-based access controls through a communication channel in a message-based operating system, where the commands to operating system elements are transmitted as client messages over a communication channel in the message-based operating systems;
identifying client messages that are subject to path-based access controls at a path manager in response to a kernel;
identifying access to file system paths, based on a list of rules that provide a grant and an access restriction to file system paths to server applications; and
controlling, in the message-based operating system, access to the file system paths;
where controlling access to the file system paths occurs through an authentication protocol that assures the identity of the path manager and the integrity of a reply message controlling the resources provided to a client process requesting access.

19. The method of claim 18, further comprising transmitting a request message from a client application to one or more of the server applications such that the message is routed based on the reply message.

20. The method of any of any of claims 18 and 19 where the where the kernel comprises a micro-kernel, control of the file system in the message-based operating system is not part of the kernel.

21. The method of any of claims 18 and 19 where the path-based access controls comprise a shadow tree corresponding to the grant and the access restriction placed on the client messages.

22. The method of any of claims 18 and 19 where the act of controlling access to the file system paths further comprises not identifying file system paths when access is denied.

23. The system of any of claims 1 to 6 where the path-based access control comprises a shadow tree corresponding to the grant and the access restrictions placed on the client messages.

24. The system of any of claims 1 to 6 where the path manager is further executable by the processor to not transmit reply messages to the sender of the client messages via the communication channel when access to the file systems paths is denied.

The disclosed distributed message-based operating systems and methods ensure authentication, integrity, and non-repudiation at the operating system level. By keeping selected messages secure at the operating system level, the system and methods assure that the receiver of the message can determine its origin and path privileges. This means that an unauthorized intruding process cannot disguise itself as an authorized process when attempting to access a path. The security behind the path-based access controls protocol used in this distributed message-based operating system also makes it possible for the receiver to verify message integrity. The protocol ensures that messages have not been modified or replaced. The protocol also ensures that a sending client cannot deny its transmission to a receiving server.

The disclosed systems and processes secure communication and access in the file system's path namespace. Path-based access control is used to isolate system behavior from one application to another. Implemented through a sandbox or a library of access rules 106 communicatively and tightly coupled to a path manager 104, the path-based access controls restrict access to the file system's path space as established for an application or groups of application clients.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system to enforce file system path-based access control in a message-based operating system, the system comprising:
   a processor; and
   a memory storing a path manager, the path manager comprising instructions executable by the processor to configure the processor to:
      receive a client message via a communication channel, corresponding to a request from a client to open a file system path, the client message having been flagged by a kernel to indicate that the client is associated with a restricted operating system environment;
      evaluate the file system path against path-based access controls to determine that the client is permitted to open the file system path; and
      further to a determination that the client is permitted to open the file system path, transmit a reply message to the client granting access to the file system path, the reply message including a digital signature by the path manager of a hash of the reply message, the digital signature being encrypted using a client public key, wherein the client may access the file system path by providing the encrypted digital signature to a server servicing the file system path, and wherein the server requests validation of the digital signature by the kernel, wherein the validation is by using a client private key held by the kernel and unavailable to the client.

2. The system of claim 1, wherein the digital signature is generated using at least one of public-key cryptography or a one-way hash function.

3. The system of claim 1, wherein the message-based operating system comprises a distributed operating system in which file system control is not part of the kernel.

4. The system of claim 1, wherein the path-based access controls correspond to a sandbox.

5. The system of claim 1, wherein the kernel comprises a micro-kernel.

6. The system of claim 1 wherein evaluating the file system path against path-based access controls to determine that the client is permitted to open the file system path includes determining that the file system path is part of a shadow tree associated with the client.

7. The system of claim 1, wherein evaluating the file system path against path-based access controls includes matching the file system path against a list of rules.

8. The system of claim 7, wherein a configuration file generates the list of rules.

9. The system of claim 7, wherein evaluating the file system path against path-based access controls includes matching a canonical, absolute version of the file system path against the list of rules.

10. The system of claim 7, wherein the list of rules includes at least one of a forbidden rule or an allowed rule, wherein the client is forbidden to access file system paths matching the forbidden rule and wherein the client is permitted to access file system paths matching the allowed rule.

11. The system of claim 1, wherein the instructions are executable by the processor to further configure the processor to:
   receive a second client message corresponding to a request by the client to open a second file system path, the second client message having been flagged by the kernel to indicate that the client is associated with the restricted operating system environment;
   evaluate the second file system path against the path-based access controls to determine that the client is not permitted to open the second file system path; and
   further to a determination that the client is not permitted to open the second file system path, reject access to the second file system path.

12. The system of claim 11 wherein rejecting access to the second file system path does not include transmitting a reply message to the client via the communication channel.

13. A non-transitory computer readable medium storing a path manager, the path manager comprising instructions executable by a processor, the instructions executable to:
   receive a client message through a communication channel in a message-based operating system, the client message corresponding to a request from a client to open a file system path, the client message having been flagged by a kernel to indicate that the client is associated with a restricted operating system environment;
   evaluate the file system path against path-based access controls to determine that the client is permitted to open the file system path; and
   further to a determination that the client is permitted to open the file system path, transmit a reply message to the client granting access to the file system path, the reply message including a digital signature by the path manager of a hash of the reply message, the digital signature being encrypted using a client public key, wherein the client may access the file system path by providing the encrypted digital signature to a server servicing the file system path, and wherein the server requests validation of the digital signature by the kernel, wherein the validation is by using a client private key held by the kernel and unavailable to the client.

14. The non-transitory computer readable medium of claim 13, wherein the digital signature is generated using at least one of public-key cryptography or a one-way hash function.

15. The non-transitory computer readable medium of claim 13, wherein the kernel comprises a micro-kernel.

16. The non-transitory computer readable medium of claim 13, wherein evaluating the file system path against path-based access controls includes matching the file system path against a list of rules.

17. The non-transitory computer readable medium of claim 16, wherein the list of rules is provisioned through a configuration file.

18. The non-transitory computer readable medium of claim 16 wherein the list of rules includes a first rule that grants access to at least a first file system path and the list of rules includes a second rule that denies access to at least a second file system path.

19. The non-transitory computer readable medium of claim 16, wherein evaluating the file system path against path-based access controls includes matching a canonical, absolute version of the file system path against the list of rules.

20. The non-transitory computer readable medium of claim 13, wherein the message-based operating system comprises a distributed operating system in which file system control is not part of the kernel.

21. The non-transitory computer readable medium of claim 13, wherein the path-based access controls correspond to a sandbox.

22. A method to enforce file system path-based access controls in a message-based operating system, the method comprising:

receiving, by a path manager, a client message through a communication channel, the client message corresponding to a request from a client to open a file system path, the client message having been flagged by a kernel of the message-based operating system to indicate that the client is associated with a restricted operating system environment;

evaluating, by the path manager, the file system path against path-based access controls to determine that the client is permitted to open the file system path; and further to determining that the client is permitted to open the file system path, transmitting, by the path manager, a reply message to the client granting access to the file system path, the reply message including a digital signature by the path manager of a hash of the reply message, the digital signature being encrypted using a client public key, wherein the client may access the file system path by providing the encrypted digital signature to a server servicing the file system path, and wherein the server requests validation of the digital signature by the kernel, wherein the validation is by using a client private key held by the kernel and unavailable to the client.

23. The method of claim 22 wherein the kernel comprises a micro-kernel and file system control is not part of the kernel.

24. The method of claim 22 wherein evaluating the file system path against path-based access controls to determine that the client is permitted to open the file system path includes determining that the file system path is part of a shadow tree associated with the client.

* * * * *